(12) United States Patent
Knitt

(10) Patent No.: US 10,882,523 B2
(45) Date of Patent: Jan. 5, 2021

(54) MOTORCYCLE ADAPTIVE CRUISE CONTROL TARGET TRACKING

(71) Applicant: Harley-Davidson Motor Company Group, LLC, Milwaukee, WI (US)

(72) Inventor: Andrew Alfred Knitt, Oconomowoc, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 342 days.

(21) Appl. No.: 15/894,452

(22) Filed: Feb. 12, 2018

(65) Prior Publication Data

US 2019/0248367 A1  Aug. 15, 2019

(51) Int. Cl.
*B60W 30/16* (2020.01)
*B60W 10/184* (2012.01)
(Continued)

(52) U.S. Cl.
CPC ............ *B60W 30/16* (2013.01); *B60W 10/06* (2013.01); *B60W 10/184* (2013.01);
(Continued)

(58) Field of Classification Search
CPC .... B60W 30/16; B60W 30/162; B60W 30/17; B60W 2420/42; B60W 10/184;
(Continued)

(56) References Cited

U.S. PATENT DOCUMENTS 6,708,100 B2 * 3/2004 Russell ................ H01Q 1/3233
701/300
6,720,920 B2 * 4/2004 Breed ...................... G01S 17/89
342/386
(Continued)

FOREIGN PATENT DOCUMENTS

DE 102009018006 A1 12/2009
DE 102019201141 A1 * 8/2019 ............ B60W 30/16
(Continued)

OTHER PUBLICATIONS

Adaptive Cruise Control System for two wheelers to avoid and reduce accidents; Swetha I Hiremath ; Shruti M Sampagoan ; Shubha D Ojanahalli ; Santosh Bhajantri ; M Kaushik; Confluence 2013: The Next Generation Information Technology Summit (4th International Conference); IET Conference Paper. (Year: 2013).*

(Continued)

*Primary Examiner* — Cuong H Nguyen

(74) *Attorney, Agent, or Firm* — Michael Best & Friedrich LLP

(57) ABSTRACT

A system for providing adaptive cruise control in a motorcycle. The system includes an electronic controller configured to determine the presence of a vehicle on one side of a direct path of travel of the motorcycle based on data received from a transceiver, the vehicle within a field of view of the transceiver. The electronic controller locks the motorcycle with the vehicle and dynamically controls the speed of the motorcycle based on an output of a kinematic controller, wherein the kinematic controller configured to receive an input including at least one of an item selected from the group consisting of distance of the motorcycle to the vehicle, velocity of the vehicle, velocity of the motorcycle, a cruise set speed associated with the motorcycle, a desired separation distance between the motorcycle and the vehicle, and a desired separation time between the motorcycle and the vehicle.

26 Claims, 13 Drawing Sheets

(51) Int. Cl.
*B60W 50/08* (2020.01)
*B60W 50/14* (2020.01)
*B60W 10/06* (2006.01)

(52) U.S. Cl.
CPC .......... *B60W 50/085* (2013.01); *B60W 50/14* (2013.01); *B60W 2050/146* (2013.01); *B60W 2300/36* (2013.01); *B60W 2420/42* (2013.01); *B60W 2420/52* (2013.01); *B60W 2420/54* (2013.01); *B60W 2520/10* (2013.01); *B60W 2554/4041* (2020.02); *B60W 2554/801* (2020.02); *B60W 2554/804* (2020.02); *B60W 2720/10* (2013.01); *B60W 2754/30* (2020.02); *B60W 2754/50* (2020.02)

(58) Field of Classification Search
CPC .. B60T 2201/02; B60T 8/3225; B60T 8/1706; B60T 7/22; B60T 2201/081; B60K 31/0008; B60Y 2200/12
USPC ................. 340/435; 342/70; 701/93, 96
See application file for complete search history.

(56) References Cited

U.S. PATENT DOCUMENTS

| | | | | |
|---|---|---|---|---|
| 6,748,312 | B2* | 6/2004 | Russell | G01S 13/87 701/96 |
| 8,493,196 | B2 | 7/2013 | Pandy | |
| 8,930,128 | B2 | 1/2015 | Kim et al. | |
| 2002/0072843 | A1* | 6/2002 | Russell | H01Q 3/24 701/96 |
| 2002/0198632 | A1* | 12/2002 | Breed | G08G 1/164 701/1 |
| 2003/0004633 | A1* | 1/2003 | Russell | H01Q 1/3233 701/96 |
| 2008/0046159 | A1* | 2/2008 | Baijens | B60T 8/3225 701/93 |
| 2012/0119894 | A1* | 5/2012 | Pandy | B60W 30/16 340/435 |
| 2019/0135372 | A1* | 5/2019 | Knitt | H05B 1/0236 |
| 2019/0248367 | A1* | 8/2019 | Knitt | B60W 10/06 |
| 2019/0256161 | A1* | 8/2019 | Dobrinin | B62J 33/00 |
| 2020/0108830 | A1* | 4/2020 | Grelaud | B60W 30/16 |

FOREIGN PATENT DOCUMENTS

| | | | |
|---|---|---|---|
| EP | 172770 B1 | 10/2010 | |
| JP | 2019137392 A | * 8/2019 | ............ B60W 50/14 |

OTHER PUBLICATIONS

Motorcycle inertial parameters identification via algorithmic computation of state and design sensitivities; M. Fouka ; L. Nehaoua ; H. Arioui ; S. Mammar; 2018 IEEE Intelligent Vehicles Symposium (IV); IEEE Conference Paper. (Year: 2018).*

U-V-disparity: an efficient algorithm for stereovision based scene analysis; Z. Hu ; K. Uchimura; IEEE Proceedings. Intelligent Vehicles Symposium, 2005. (Year: 2005).*

Telematics might steer your car into the future; T. Titsworth; IEEE MultiMedia; vol. 9, Issue: 3; Magazine Article; Publisher: IEEE. (Year: 2002).*

A complete U-V-disparity study for stereovision based 3D driving environment analysis; Zhencheng Hu ; F. Lamosa ; K. Uchimura; Fifth International Conference on 3-D Digital Imaging and Modeling (3DIM'05); Conference Paper ; Publisher: IEEE (Year: 2005).*

* cited by examiner

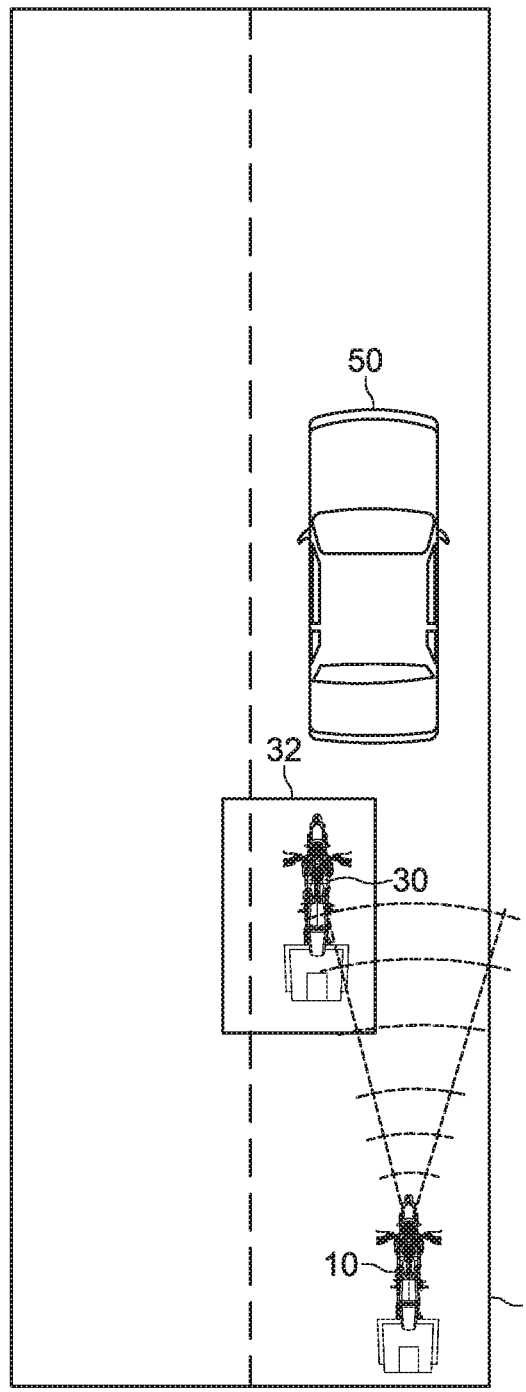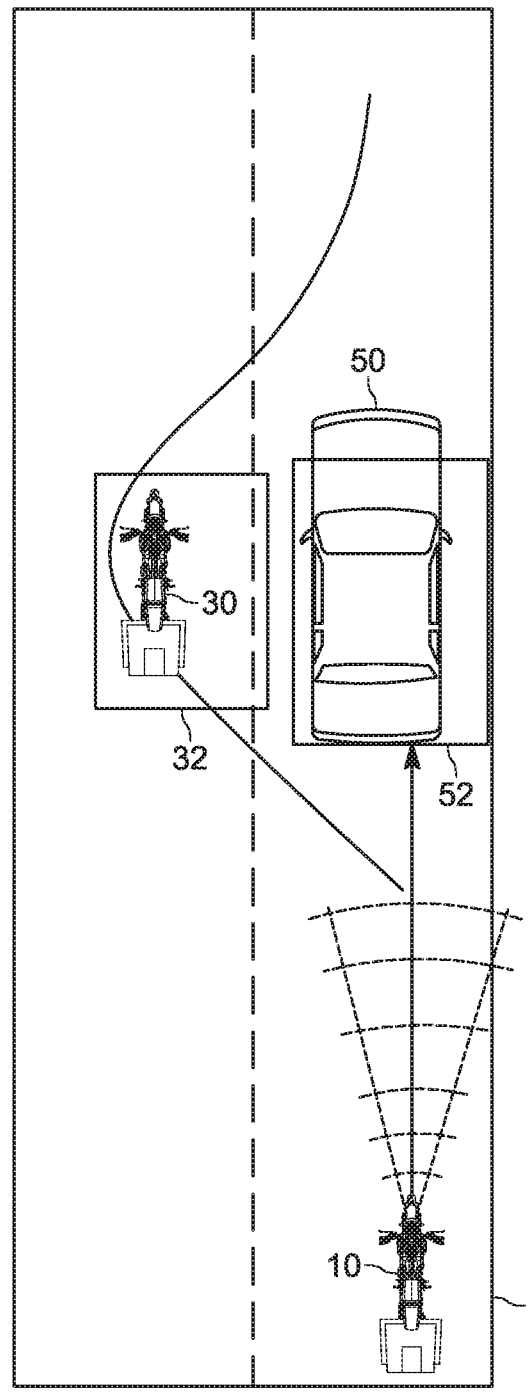
FIG. 8A                    FIG. 8B

MOTORCYCLE ADAPTIVE CRUISE CONTROL TARGET TRACKING

FIELD

Embodiments described herein relate generally to a motorcycle system. More specifically, the embodiments described herein relate to adaptive cruise control systems and methods for motorcycles.

SUMMARY

Automotive adaptive cruise control (ACC) systems use radar sensors, cameras, LIDAR sensors, or a combination thereof to automatically control the speed of vehicle based on the distance or time to a preceding vehicle in a lane of travel. A motorcycle, however, may be faced with different driving patterns than an automobile. For example, because generally only one automobile (passenger vehicle) fits within a lane of travel, automotive ACC systems assume that the preceding vehicle (the vehicle directly in front of the vehicle hosting the ACC system) should be the target for the ACC system. However, as a motorcycle is generally narrower than an automobile, a motorcycle may not be centered in a lane of travel, which may impact what vehicle is considered the preceding vehicle. Similarly, when motorcycles ride in a staggered formation, an automotive ACC system may not properly set the target vehicle. For example, in a staggered or off-center formation, an automotive ACC system may set the target vehicle to a directly preceding vehicle, which may not be nearest vehicle to the motorcycle. Also, in a staggered or off-center formation, an automotive ACC system may not be able to determine whether a vehicle detected in front of a motorcycle is in the same lane or an adjacent lane of travel, which impacts whether the detected vehicle should be set as the target vehicle. For these and other reasons, automotive ACC systems are ill-equipped to handle driving distinctions between automobiles and motorcycles.

Thus, systems and methods are provided herein that, among other things, provides adaptive cruise control for a motorcycle. One embodiment provides a system for providing adaptive cruise control in a motorcycle. The system includes an electronic controller coupled to the transceiver. The electronic controller including an electronic processor configured to determine the presence of a first vehicle on one side of a direct path of travel of the motorcycle based on data received from a transceiver, the first vehicle within a field of view of the transceiver. The electronic processor further configured to lock the motorcycle with the first vehicle and control the speed of the motorcycle dynamically based on an output of a first kinematic controller, wherein the first kinematic controller is configured to receive a first input including at least one of an item selected from the group consisting of distance of the motorcycle to the first vehicle, velocity of the first vehicle, velocity of the motorcycle, a cruise set speed associated with the motorcycle, a desired separation distance between the motorcycle and the first vehicle, and a desired separation time between the motorcycle and the first vehicle.

Another embodiment provides a method for providing adaptive cruise control in a motorcycle. The method includes determining, with an electronic processor, the presence of a first vehicle on one side of a path of travel of the motorcycle, the first vehicle within a field of view of the transceiver. The method also includes and dynamically controlling, with the electronic processor, the speed of the motorcycle based on an item selected from the group consisting of distance of the motorcycle to the first vehicle, velocity of the first vehicle, velocity of the motorcycle, a cruise set speed associated with the motorcycle, a desired separation distance between the motorcycle and the first vehicle, and a desired separation time between the motorcycle and the first vehicle.

Another embodiment provides a non-transitory, machine-readable medium containing computer-executable instructions that when executed by one or more electronic processors cause the one or more electronic processors to perform a set of functions. The set of functions to perform determining the presence of a first vehicle on one side of a path of travel of the motorcycle, the first vehicle within a field of view of the transceiver. The set of functions to perform dynamically controlling of the speed of the motorcycle based on an item selected from the group consisting of distance of the motorcycle to the first vehicle, velocity of the first vehicle, velocity of the motorcycle, a cruise set speed associated with the motorcycle, a desired separation distance between the motorcycle and the first vehicle, and a desired separation time between the motorcycle and the first vehicle.

Other aspects of the various embodiments provided herein will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 7A-7B and 8A-8B are illustrations of several riding scenarios of a motorcycle in accordance with some embodiments.

Figure 1:
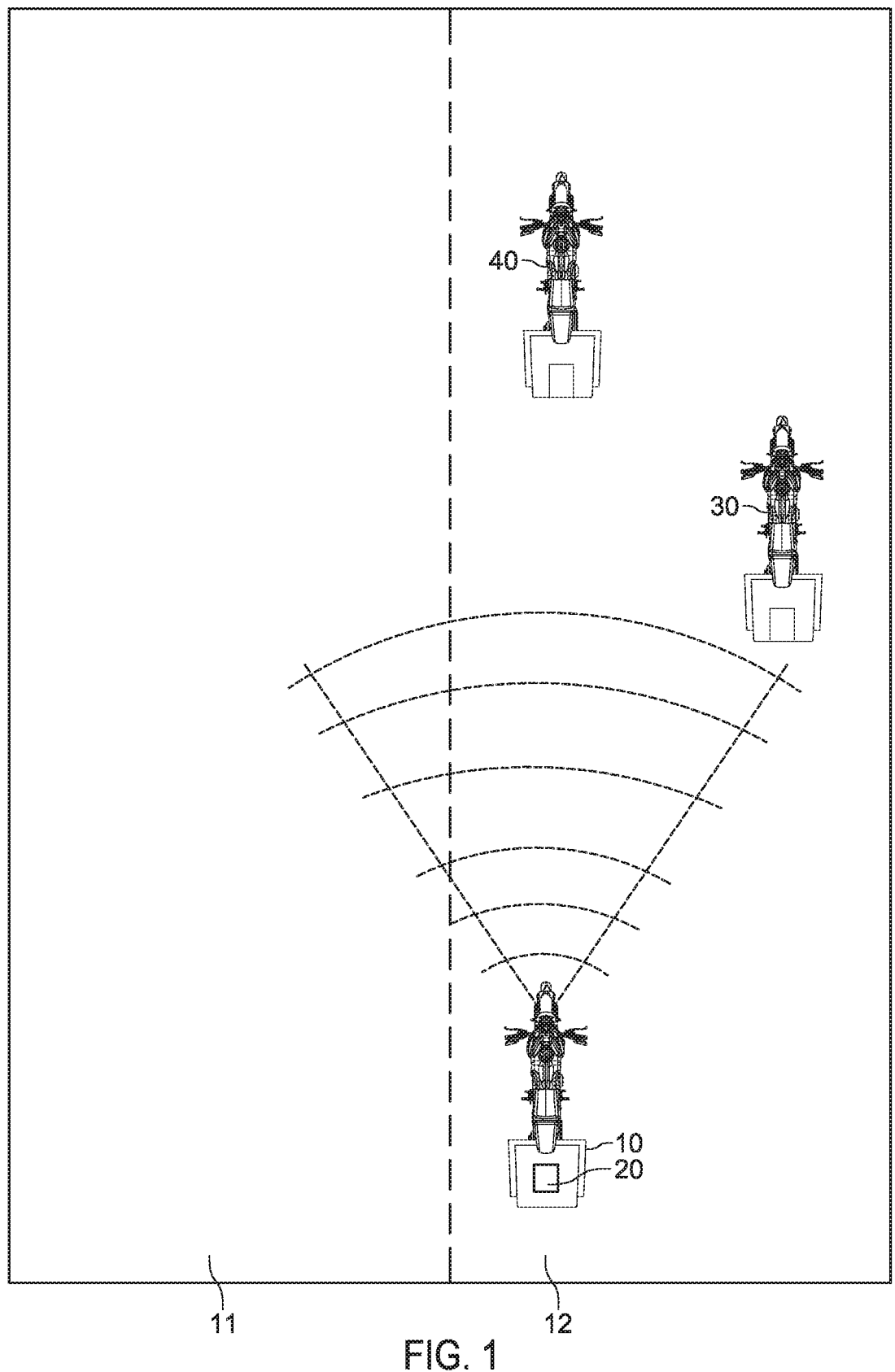
FIG. 1 is an illustration of a motorcycle on a road in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments provided herein. The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. Moreover, relational terms such as first and second, top and bottom, and the like may be used herein solely to distinguish one entity or action from another entity or action without necessarily requiring or implying any actual such relationship or order between such entities or actions.

FIG. 1 is an illustration of a motorcycle 10 in a group riding scenario with motorcycles 30 and 40 on a road 12. The motorcycle 10 includes an adaptive cruise control system 20.

Figure 2:
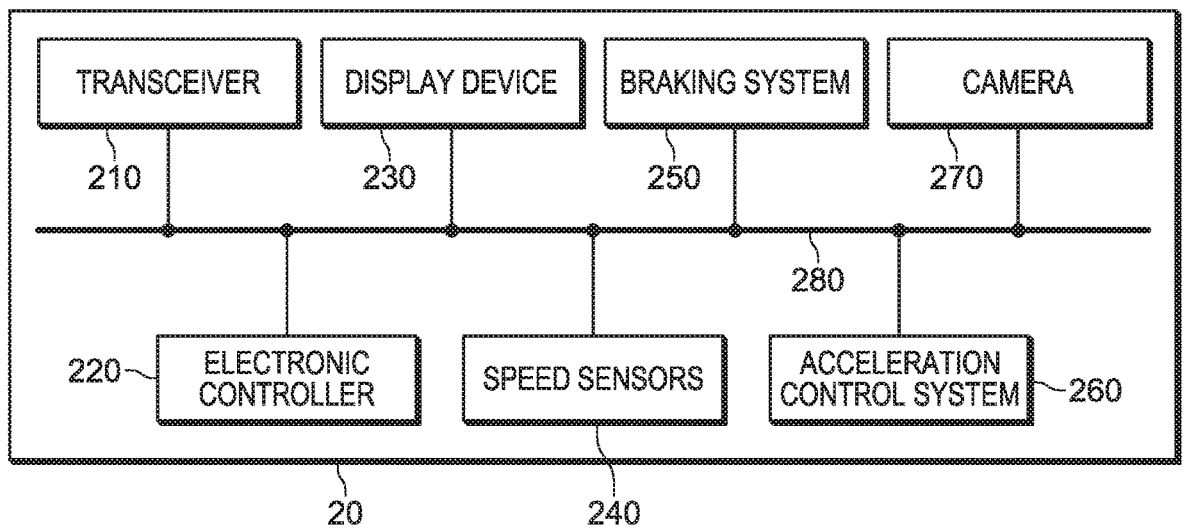
FIG. 2 is a block diagram of a system for providing target tracking and adaptive cruise control for the motorcycle of FIG. 1 in accordance with some embodiments.

FIG. 2 is a block diagram of the adaptive cruise control system 20. In the example illustrated, the system 20 includes a transceiver 210, an electronic controller 220, a display device 230, speed sensors 240, a braking system 250, an acceleration control system 260, a camera 270, and a communication bus 280. The components of the system 20 may be of various constructions and may use various communication types and protocols. The embodiment illustrated in FIG. 2 provides but one example of the components and connections of the system 20, and, in some embodiments, the system 20 includes additional components not illustrated in FIG. 2 and may perform additional functionality than the functionality described herein. The components illustrated in FIG. 2 and the connections between the components may also be constructed in other ways than those illustrated and described herein. Each of the above-listed components of the system 20 may also include dedicated processing circuitry including, for example, an electronic processor for receiving, processing, and transmitting data associated with the functions of each component.

In some embodiments, the transceiver 210 includes one or more radar sensors, LIDAR (light detection and ranging) sensors, ultrasonic sensors, or a combination thereof located at different positions of the motorcycle 10. The transceiver 210 is configured to receive signals (for example, RF or sound signals) indicative of the motorcycle's distance from and position relative to, vehicles in the vehicle's surrounding environment (hereinafter sometimes referred to as "surrounding vehicles") as well as the distance and position of surrounding vehicles relative to each other.

In some embodiments, the display device 230 displays one or more graphical user interfaces (as described below). The display device 230 may be a touch-sensitive device. In some embodiments, the camera 270, or components thereof, may be externally mounted to a portion of the motorcycle 10 (such as on a side mirror or front end).

In some embodiments, the speed sensors 240 are implemented using wheel speed sensors that sense rotational speed of one or both of the wheels of the motorcycle 10. In other embodiments, motorcycle speed is sensed or determined using other sensors alone or in combination with wheel speed sensors, such as, for example, using a transmission output speed sensor (TOSS) or other types of sensors. In some embodiments, a single speed sensor 240 is associated with each wheel of the motorcycle 10.

Figure 3:
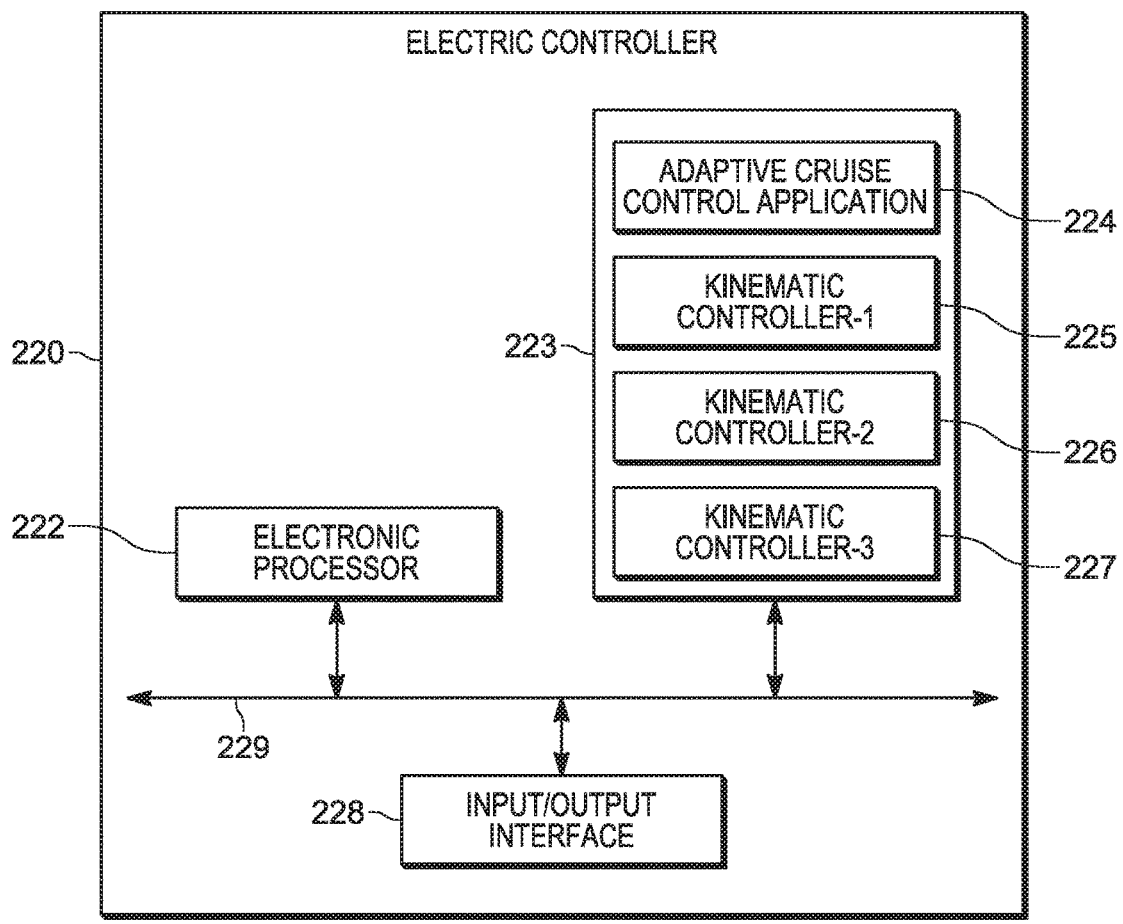
FIG. 3 is a block diagram of an electronic controller included in the system of FIG. 2 in accordance with some embodiments.

FIG. 3 is a block diagram of the electronic controller 220. The electronic controller 220 includes a plurality of electrical and electronic components that provide power, operation control, and protection to the components and modules within the electronic controller 220. The electronic controller 220 includes, among other things, an electronic processor 222 (such as a programmable electronic microprocessor, microcontroller, or similar device), a memory 223 (for example, non-transitory, machine readable memory), and an input/output interface 228 coupled to a bus 229. The electronic processor 222 is communicatively connected to the memory 223 and the input/output interface 228. The memory includes an automatic cruise control application 224, a first kinematic controller 225, a second kinematic controller 226, and a third kinematic controller 227. In some embodiments, the automatic cruise control application 224 and the kinematic controllers (225, 226, and 227) includes instructions that when executed by the electronic processor 222 cause the motorcycle 10 to perform functions as described herein. The transceiver 210, the display device 230, the speed sensors 240, the braking system 250, the acceleration control system 260 and camera 270 communicate with the electronic processor 222 via the input/output interface 228 over the bus 229. However, in other embodiments, the electronic processor 222 communicates with one or more components included in the system 20 over a dedicated connection.

The electronic controller 220 may be implemented in several independent controllers (for example, programmable electronic controllers) each configured to perform specific functions or sub-functions. Additionally, the electronic controller 220 may contain sub-modules that include additional electronic processors, memory, or application specific integrated circuits (ASICs) for handling input/output functions, processing of signals, and application of the methods listed below. In other embodiments, the electronic controller 220 includes additional, fewer, or different components.

Figure 4:
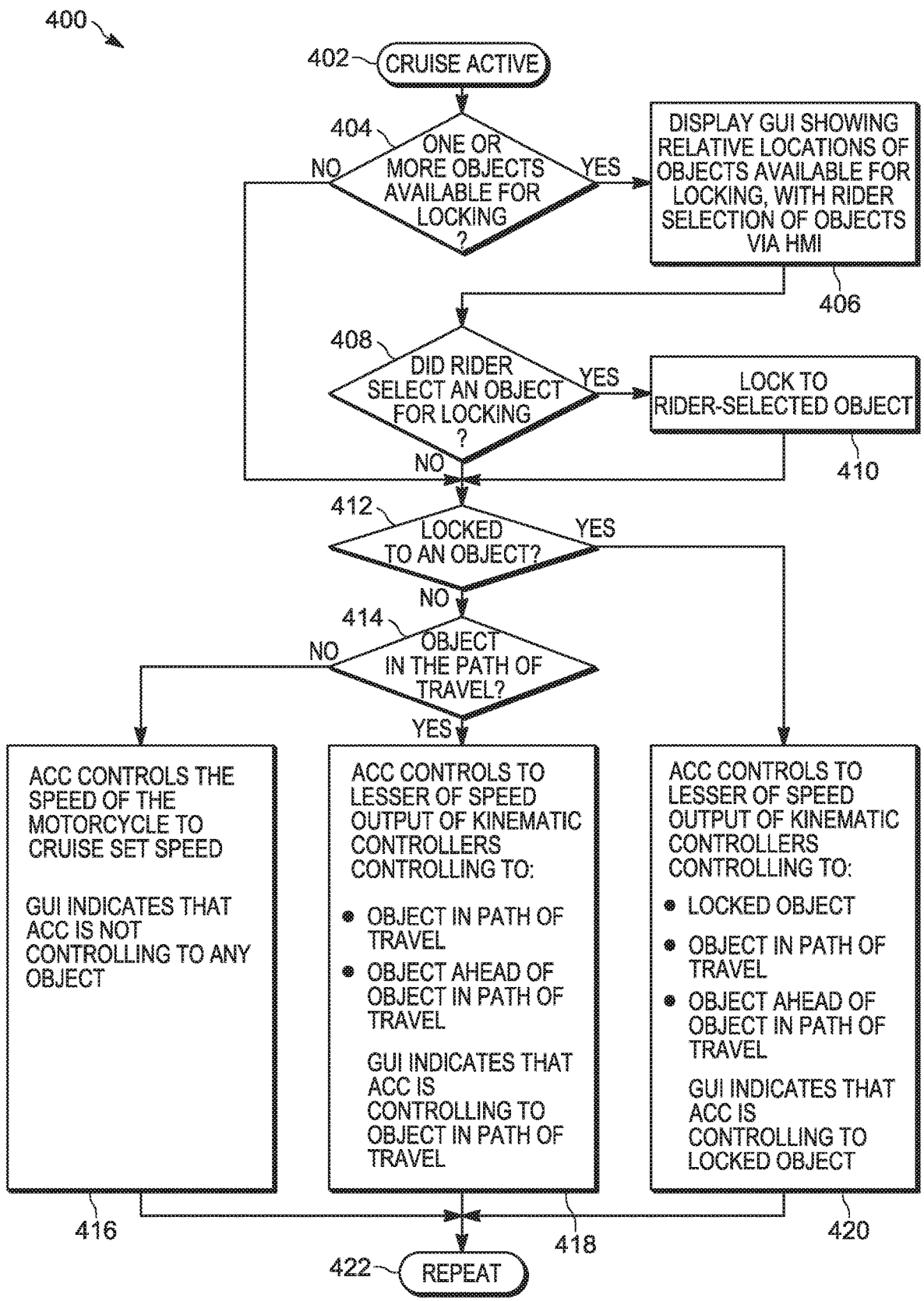
FIG. 4 is a flow chart illustrating a method for providing adaptive cruise control for a motorcycle performed by the system of FIG. 2 in accordance with some embodiments.

FIG. 4 is a flow chart illustrating a method 400 of providing adaptive cruise control for a motorcycle 10 (shown in FIG. 1) performed by the system 20. In particular, the method is described as being performed by the system 20 and, in particular, the electronic controller 220 (the electronic processor 222 executing the automatic cruise control application 224. As described in more detail below, the automatic cruise control application 224 includes instructions stored in memory 223 that are executed by the electronic processor 222 to provide, among other things, a graphical user interface to be displayed on the display device 230 and adaptive cruise control for the motorcycle 10 while riding amongst a group of motorcycles, such as in a staggered formation. As illustrated in FIG. 4, at block 402, an adaptive cruise control application 224 is executed. At block 404, the controller 220 determines if one or more vehicles (such as motorcycles) are available for locking based on data received from the transceiver 210. In some embodiments, the motorcycle 10 is understood to be locked onto motorcycle 30 when the adaptive cruise control application 25 has stored the unique identifier of motorcycle 30 generated by transceiver 210 into a location in memory 223 that is reserved for storing the unique identifier of a locked object, and when motorcycle 30 is visible to transceiver 210. If one or more vehicles are identified at block 404, the method 400 proceeds to block 406 otherwise the method 400 proceeds to block 412. At block 406, the display device 230 displays a graphical user interface showing relative locations of the objects available for locking. In some embodiments, the rider of the motorcycle 10 selects an object (such as a nearest motorcycle riding within a group including the motorcycle 10) for locking using the display device 230. In some embodiments, the rider of the motorcycle 10 selects an object for locking using an input device (for example, a joystick, push button, etc.) located on the hand control (for example, a handle bar) of the motorcycle 10. In some embodiments, the rider of the motorcycle 10 selects an object for locking using a voice command.

At block 408, the method 400 determines whether the rider of the motorcycle 10 has selected an object (for example, motorcycle 30 in FIG. 5B) for locking. The method 400 proceeds to block 410, if the rider of the motorcycle 10 selects an object for locking. On the other hand, if the rider of the motorcycle 10 does not select an object for locking, the method 400 proceeds to block 412. At block 412, if the motorcycle 10 is locked to an object then the method 400 proceeds to block 420. At block 420, the controller 220 controls to lesser of speed output of kinematic controllers (225, 226, and 227) controlling to a locked object, an object in the path of travel, and an object ahead of the object in the path of travel.

At block 412, when the motorcycle 10 is not locked to an object then the method 400 proceeds to block 414. At block 414, the method 400 includes determining if the object is the path of travel of motorcycle 10. At block 414, when the object is in the path of travel of the motorcycle 10 then the method 400 proceeds to block 418. At block 418, the method 400 includes controlling to the lesser of speed output of the kinematic controller 226 controlling to an object in the path of travel of motorcycle 10 and output of the kinematic controller 227 controlling to an object ahead of the object in the path of travel of the motorcycle 10.

At block 412, if the object is not in the path of travel of the motorcycle 10 then the method 10 proceeds to block 416. At block 416, the method 400 includes controlling the speed of the motorcycle 10 to the set cruise speed of the motorcycle 10.

Figure 5A:
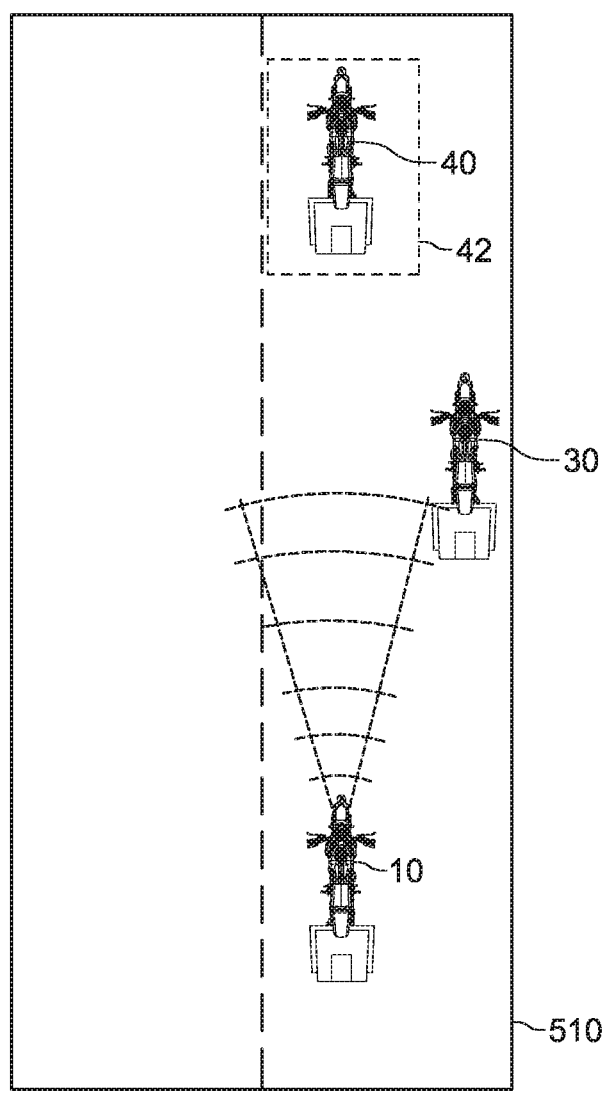
FIGS. 5A-5B illustrate a motorcycle traveling in a group riding scenario in accordance with some embodiments.
Figure 5B:
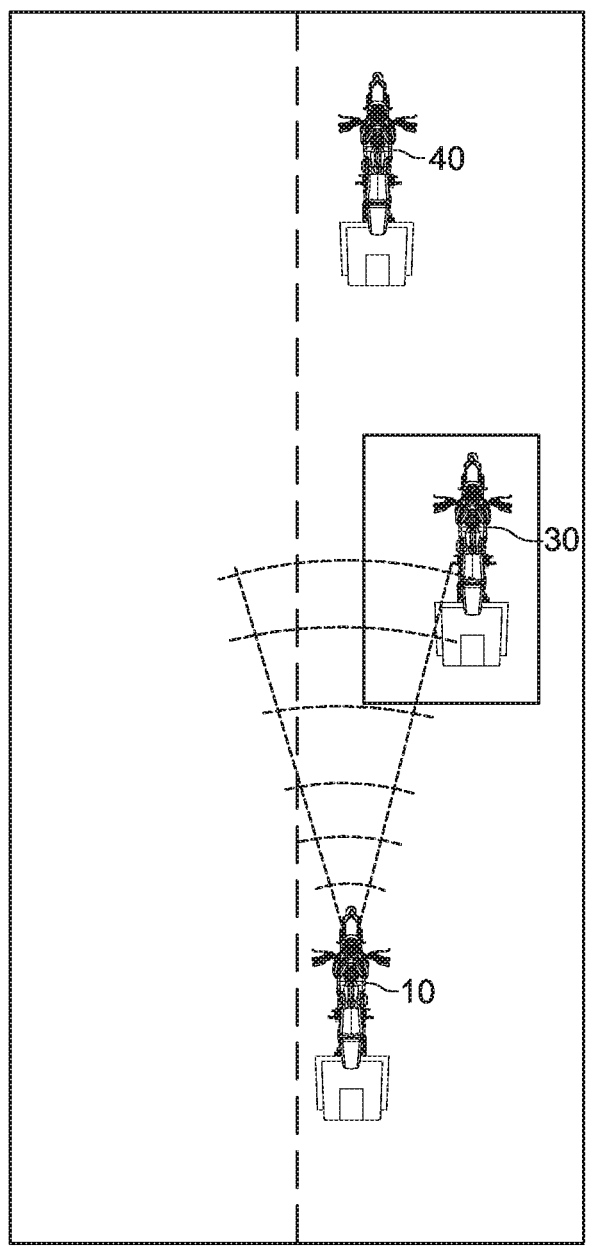

FIGS. 5A-5B illustrate a motorcycle traveling in a group riding scenario in accordance with some embodiments. FIG. 5A shows the motorcycle 10 detecting the motorcycle 40 riding directly in front in the path of travel of the motorcycle 10. In some embodiments, a graphical user interface displayed in the display device 230 shows motorcycle 40 as being highlighted. In the example shown in FIG. 5A, the motorcycle 40 is shown within a rectangular box 42 having dotted lines to indicate that motorcycle 10 speed is being controlled by the motorcycle 40. In some embodiments, the motorcycle also detects and displays the motorcycle 30 that is staggered and offset to the right of the motorcycle 10 when the motorcycle 30 is within the field-of-view of the transceiver 210.

FIG. 5B shows the motorcycle 10 detecting the motorcycle 30 and being available for locking the motorcycle 10 with the motorcycle 30. The motorcycle 30 is shown within a rectangular box 32 having solid lines to indicate that the motorcycle 10 is locked to the motorcycle 30.

Figure 6:
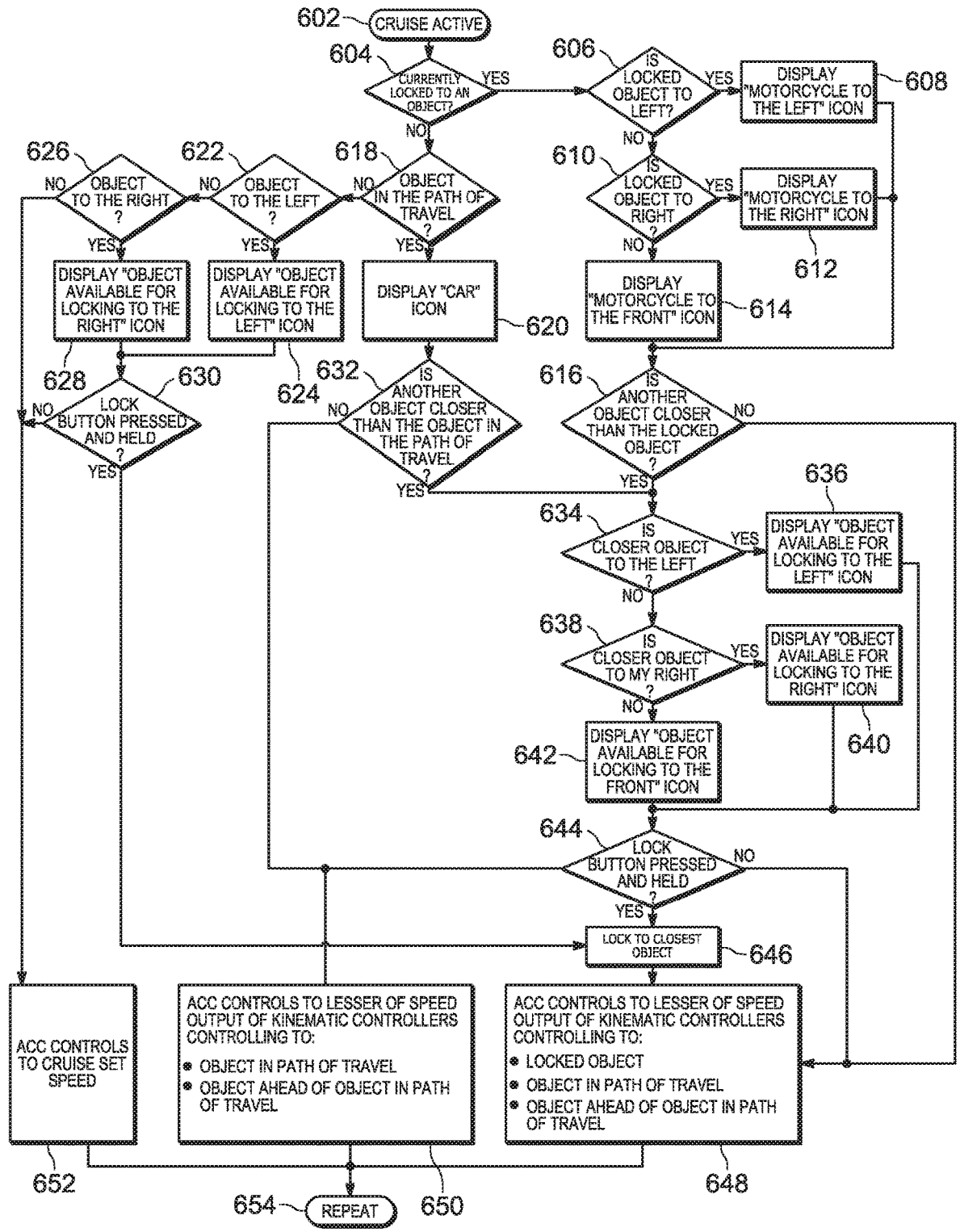
FIG. 6 is a flow chart illustrating a method for providing adaptive cruise control for a motorcycle performed by the system of FIG. 2 in accordance with some embodiments.

FIG. 6 is a flow chart illustrating a further detailed method 600 for providing adaptive cruise control in a motorcycle 10. The method 600 includes block 602, where the motorcycle 10 is in an active cruise control mode. In some embodiments, the user of the motorcycle 10 activates the cruise control mode using a cruise control switching mechanism (for example, using a button) residing on one end of the hand control (for example, the handle bar) of the motorcycle 10.

At block 604, the electronic controller 220 determines whether the motorcycle 10 is locked to a nearby vehicle (for example, motorcycle 30 shown in FIGS. 5A-5C). When the motorcycle 10 is locked onto a nearby vehicle, the method 600 proceeds to the block 606. When the motorcycle 10 is not locked onto a nearby vehicle, the method 600 proceeds to the block 618.

At block 606, the electronic controller 220 determining whether the motorcycle 10 is locked to an object to the left side of motorcycle 10. When the motorcycle is locked onto a nearby motorcycle 30 (as shown in FIG. 8A) that is to the left of motorcycle 10, then the method 600 displays a "MOTORCYCLE" icon to the left of the motorcycle 10 in a graphical user interface displayed on the display device 230 (block 610). When the motorcycle 10 does not have a locked object to the left of motorcycle 10, then the method 100 proceeds to block 610. At block 610, the electronic controller 220 determines whether the motorcycle 10 is locked to an object to the right of the motorcycle 10. When the motorcycle 10 is locked onto a nearby motorcycle 30 (as shown in FIG. 9B) that is to the right of motorcycle 10, then the method 600 includes displaying a "MOTORCYCLE" icon to the right of the motorcycle 10 in a graphical user interface displayed on the display device 230 (block 612). When the motorcycle 10 does not have an object to its right or to its left, the method 600 proceeds to block 614. At block 614, the display device 230 displays a "MOTORCYCLE" icon directly to the front of the motorcycle 10 in the graphical user interface displayed on the display device 230 (block 614). The method 600 further proceeds to block 616 where the electronic controller 220 determines whether another object closer than the locked object is present. When there is an object closer to the motorcycle 10 than the locked object, the method 600 proceeds to block 634. When there is no object closer than the locked object, the method 600 proceeds to block 648.

Returning to block 618, the electronic controller 220 determines whether an object is in the path of travel of motorcycle 10. When it is determined that there is an object in the path of travel of motorcycle 10, the display device 230 displays a "CAR" icon in the path of travel of the motorcycle 10. Upon displaying the "CAR" icon, the method 600 further proceeds to block 632. At block 618, when it is determined than there is no object in the path of travel of the motorcycle 10, the method 600 proceeds to block 622. At block 622, the electronic controller 220 determines whether there is an object to the left of the motorcycle 10. When there is an object to the left of the motorcycle 10, the electronic controller 220 displays an icon to show that an object is available for locking to the left of the motorcycle 10 (block 624). When there is no object to the left of the motorcycle 10, the method 600 proceeds to block 626. At block 626, the electronic controller 220 determines whether an object is to the right of the motorcycle 10. When there is an object to the right of the motorcycle 10, the display device 230 displays an icon to show that an object is available for locking to the right of the motorcycle 10 (block 628). When it is determined that there are no objects to right of the motorcycle 10 at block 626, the method 600 proceeds to block 652.

After each of the blocks 624 and 628, the method 600 proceeds to block 630. At block 630, the electronic controller 220 determines whether a locking function is activated by pressing and holding down a lock button for a short period of time (for example, 3 seconds). When the locking function is activated at block 630, the method 600 proceeds to lock the motorcycle 10 to the nearest object (block 646). When the locking function is not active at block 630, the method 600 proceeds to block 652.

At block 632, the electronic controller 220 determines if there is an vehicle closer than the locked vehicle. When there is an object closer than the locked vehicle, the method proceeds to block 634. The method 600 proceeds by determining, via the electronic controller 220, as to whether the closer object is to the left (block 634) or to the right (block 638). When the closer object is to the left, the display device 230 displays an icon to represent that an object is available for locking to the left of the motorcycle 10 (block 636). When the closer object is to the right, the display device 230 displays an icon to represent that an object is available for locking to the right of the motorcycle 10 (block 640).

At blocks 634 and 638, when it is determined that there are no closer objects to either the left or right of the motorcycle 10, then the display device 230 displays an icon to represent an object is available for locking to the front of the motorcycle 10. The method 600 further proceeds to block 644. At block 644, the method 600 includes pressing and holding down a lock button for a short period of time to lock the motorcycle 10 to the closest object (block 646). Alternatively, at block 644, when a locking function is not active by pressing the lock button, the method 600 proceeds to block 648. At blocks 634 and 638, when it is determined that there are no closer objects to either the left or right of the motorcycle 10, then the method 600 includes displaying an icon to represent an object is available for locking to the front of the motorcycle 10. The method 600 further proceeds to block 644. At block 644, the method 600 includes pressing and holding down a button for a short period of time to lock the motorcycle 10 to the closest object (block 646). In some embodiments, the button used for locking may not be a dedicated button, but may be a button used for other related functions but performs the lock function when pressed and held. In some embodiments, locking may be commanded via a short momentary press and another function activated via a longer press and hold of the same button. Alternatively, at block 644, when a locking function is not active by pressing the lock button, the method 600 proceeds to block 648.

At block 648, the electronic controller 220 controls the motorcycle 10 to the lesser speed output of kinematic controllers controlling to a locked object 30 (shown in FIG. 7B), a second object 40 in the path of travel (shown in FIG. 7A), and a third object (not shown in FIG. 7B) ahead of the second object 40 in the path of travel of motorcycle 10.

At block 650, the electronic controller 220 controls the motorcycle 10 to the lesser of a speed output of kinematic controllers controlling to a first object in the path of travel and a second object ahead of the first object in the path of travel of motorcycle 10. At block 652, the method 600 includes controlling the motorcycle 10 at a cruise set speed using the adaptive cruise control system 20.

Figure 7A:
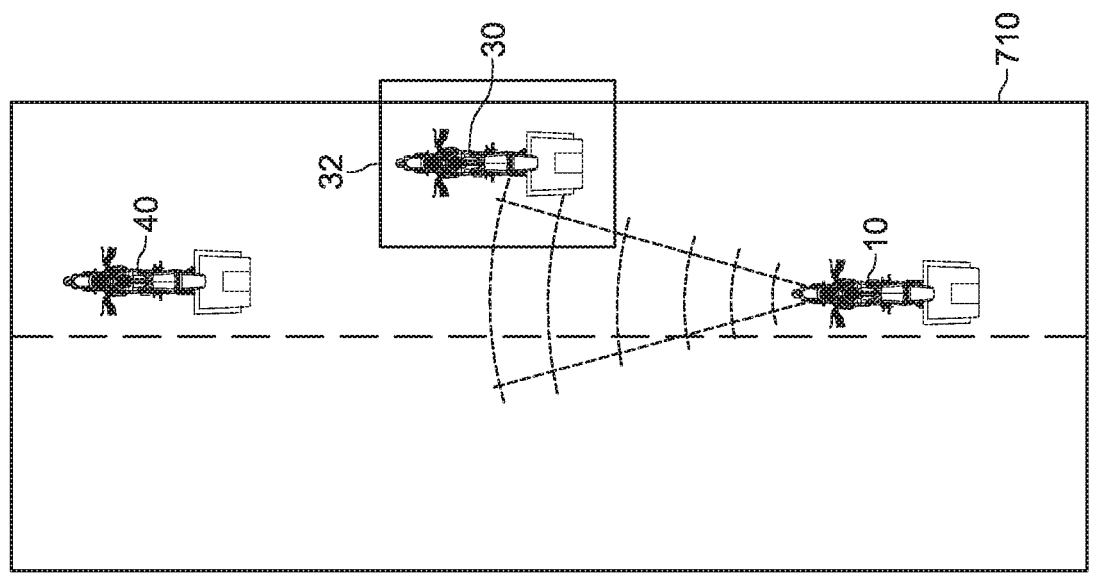
Figure 7B:
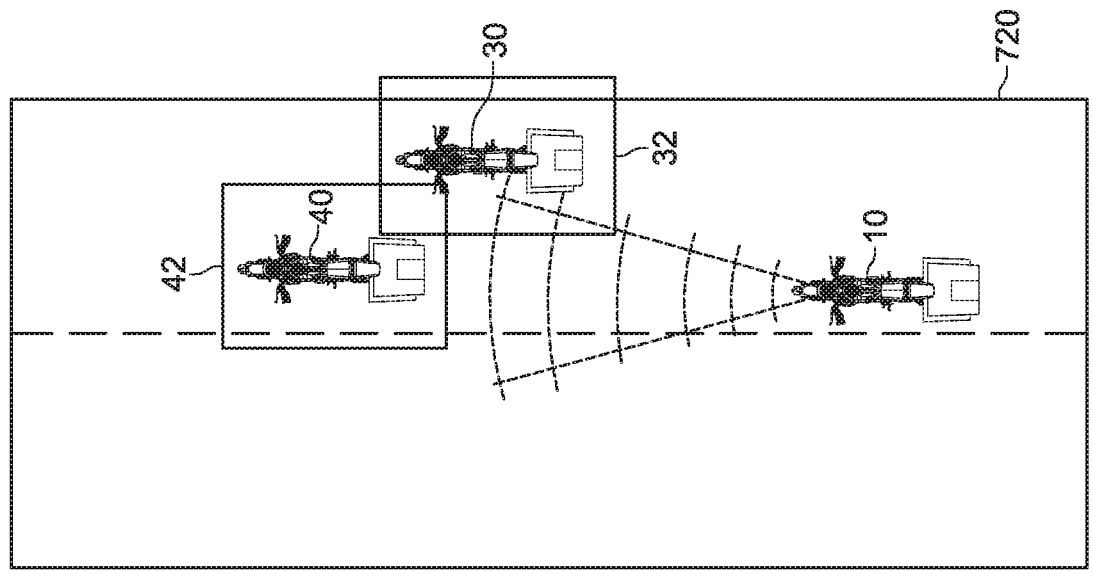

FIGS. 7A-7B are illustrations of graphical user interfaces having various objects used for controlling the speed of a motorcycle in a group riding scenario, in accordance with some embodiments. FIG. 7A is a graphical user interface 710 showing the motorcycle riding in the back of the group and locked in with motorcycle 30 that is riding staggered to the right of motorcycle 10. Rectangle 32 indicates to the rider of motorcycle 10 that the motorcycle 10 is locked onto the motorcycle 30. Also riding ahead of motorcycle 10 and motorcycle 30 is the leader of the group (motorcycle 40). FIG. 7B is a graphical user interface 720 that shows the motorcycle 10 that is locked onto motorcycle 30 further controlling to motorcycle 40 as it slows its speed. When motorcycle 40 slows down and is within a predetermined gap time with either the motorcycle 30 or motorcycle 40, then the rectangle 42 indicates that the system 20 is controlling motorcycle 10 based on the speed and position of motorcycle 40 rather than motorcycle 30 because controlling to motorcycle 40 requires a slower speed/greater deceleration than by controlling to motorcycle 30.

FIGS. 8A-8B are illustrations of graphical user interfaces having objects used for controlling the speed of the motorcycle 10 by locking to a target (motorcycle 30) that is offset in a lane begins overtaking a vehicle in the same lane, in accordance with some embodiments. FIG. 8B shows the motorcycle 30 shifting to the left lane to get ready for overtaking vehicle 50. Once the motorcycle 30 moves over to the left lane, then the speed of motorcycle 10 needs to be lowered to maintain the desired gap to vehicle 50 other than keeping the desired gap to vehicle 30. As a result, motorcycle 10 may begin to control to vehicle 50 (if the output of the kinematic controller tracking vehicle 50 is proving a speed/acceleration request that is less than the output of the kinematic controller tracking motorcycle 30) but does not lock onto motorcycle 50 because system 20 is already locked onto motorcycle 30.

Figure 9:
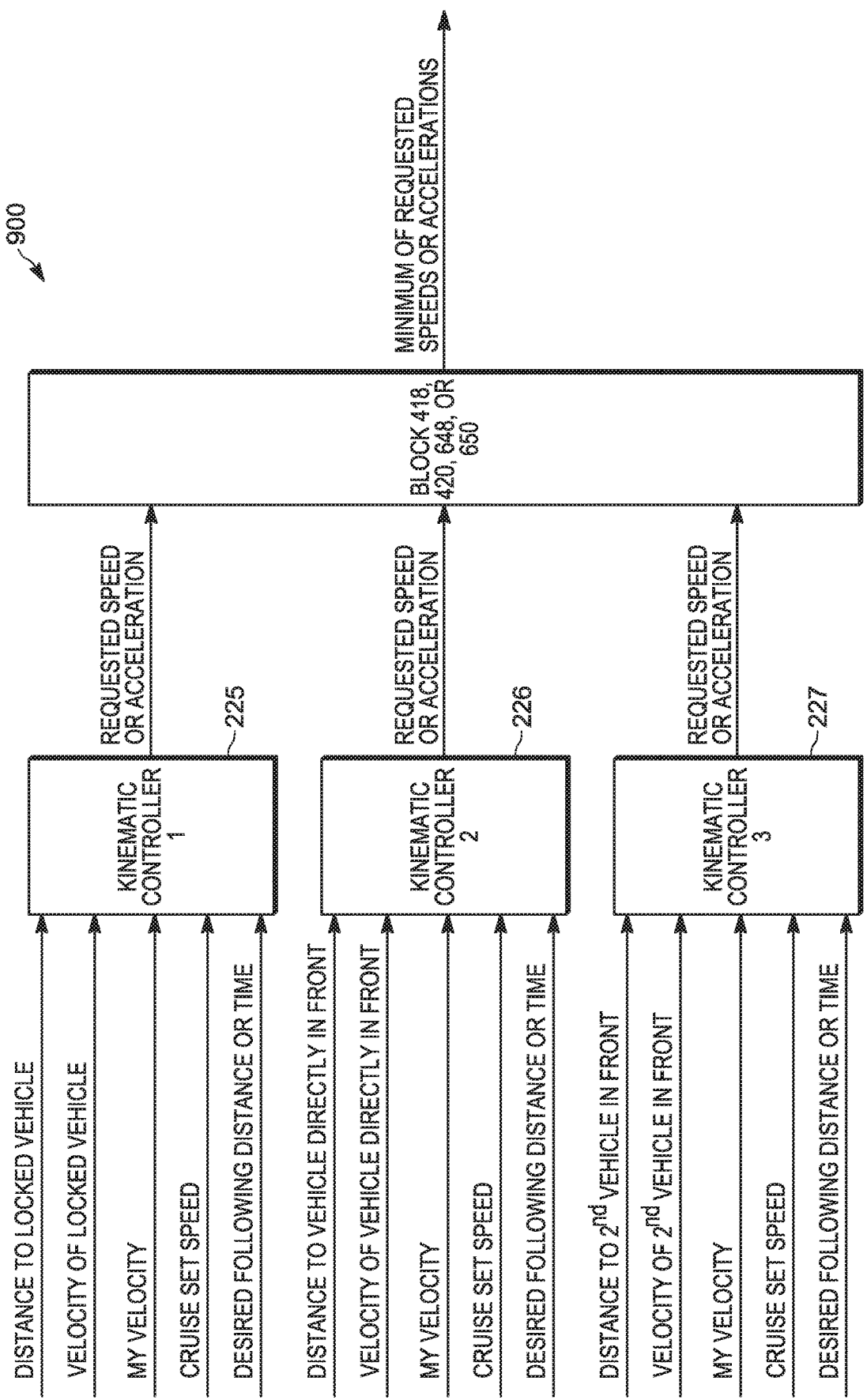
FIG. 9 shows a flow diagram of the parameters used for providing adaptive cruise control in accordance with some embodiments.

FIG. 9 shows a flow diagram 900 illustrating the parameters used for providing adaptive cruise control in accordance with some embodiments.

Figure 10:
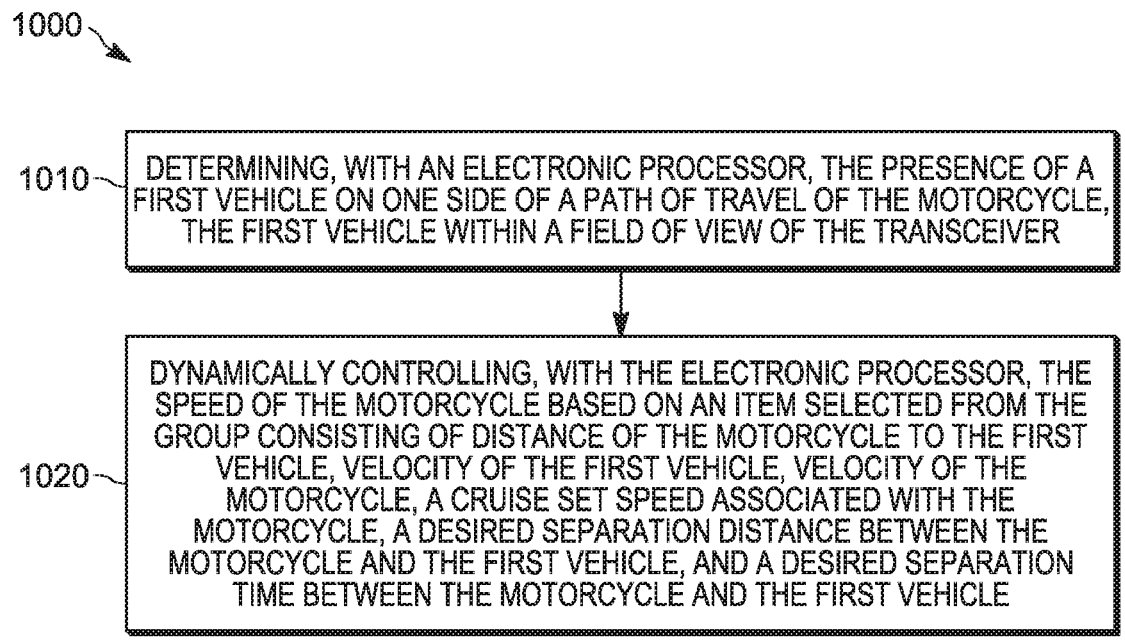
FIG. 10 is a flow chart illustrating a method for providing adaptive cruise control for a motorcycle performed by the system of FIG. 2 in accordance with some embodiments.

FIG. 10 is a flow chart illustrating a method 1000 for providing adaptive cruise control for a motorcycle performed by the system 20 in accordance with the flow diagram shown in FIG. 9. At block 1010, the electronic processor 222, determines the presence of a first motorcycle 30 on one side of a path of travel of the motorcycle 10, wherein the first motorcycle 30 is within a field of view of the transceiver 210.

At block 1020, the electronic processor 222 dynamically controls the speed of the motorcycle dynamically based on an output of a first kinematic controller 225, wherein the first kinematic controller is configured to receive a first input including at least one of an item selected from at least one of a distance of the motorcycle 10 to the motorcycle 30, the velocity of the motorcycle 30, velocity of the motorcycle 10, a desired separation distance (for example, a gap distance) between the motorcycle 10 and the motorcycle 30, and a desired separation time (for example, a gap time) between the motorcycle 10 and the motorcycle 30 (as shown in FIG. 9).

In some embodiments, the electronic processor 222 determines the presence of a second vehicle 30, wherein the second vehicle 40 is in the direct path of travel of the motorcycle. The electronic processor 222 is further configured to control the speed of the motorcycle 10 dynamically based on an output of a second kinematic controller 226, wherein the second kinematic controller 226 is configured to receive a second input including at least one of an item selected from the group consisting of distance of the motorcycle to the second vehicle, velocity of the second vehicle, velocity of the motorcycle, the cruise set speed associated with the motorcycle, a desired separation distance between the motorcycle and the second vehicle, and a desired separation time between the motorcycle and the second vehicle (as shown in FIG. 9).

In some embodiments, the electronic processor 222 determines the presence of a third vehicle, wherein the third vehicle is in front of the second vehicle 40. The electronic processor 222 is further configured to control the speed of the motorcycle dynamically based on an output of a third kinematic controller 227, wherein the third kinematic controller 227 is configured to receive a third input including at least one of an item selected from the group consisting of distance of the motorcycle to the third vehicle, velocity of the third vehicle, velocity of the motorcycle, a cruise set speed associated with the motorcycle, a desired separation distance between the motorcycle and the third vehicle, and a desired separation time between the motorcycle and the third vehicle.

Figure 11:
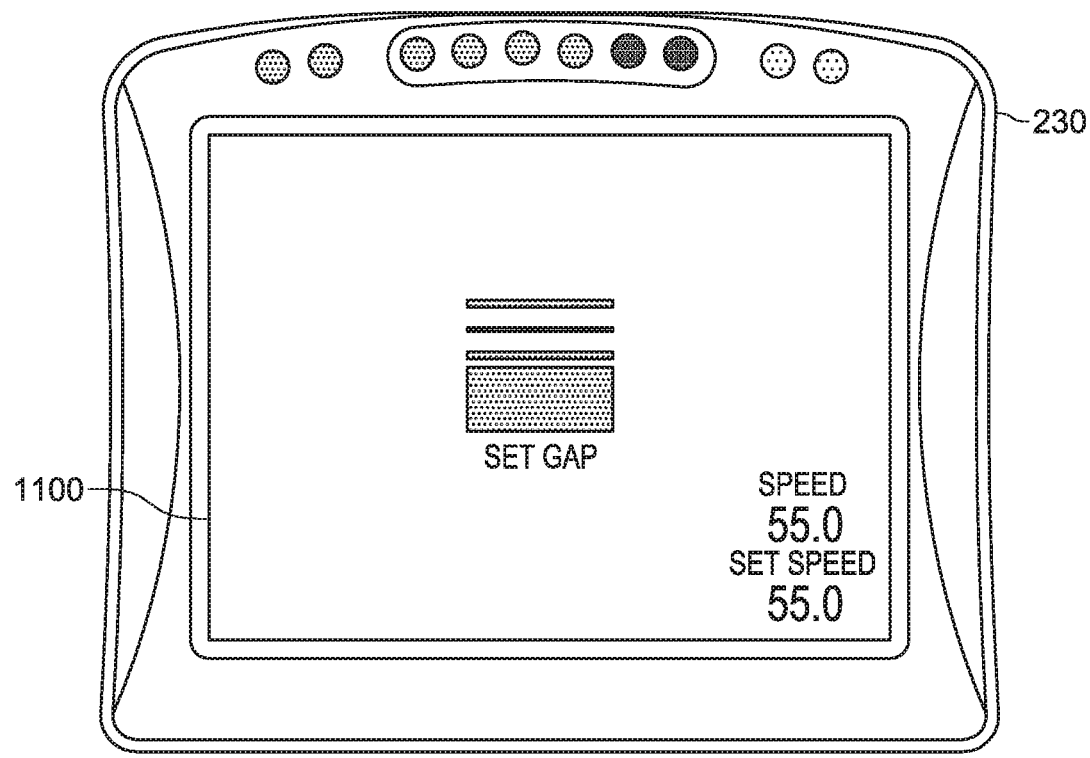
FIGS. 11-15 shows a display device displaying several graphical user interfaces illustrating vehicles available for controlling and/or locking while a user rides a motorcycle, in accordance with some embodiments.
Figure 12:
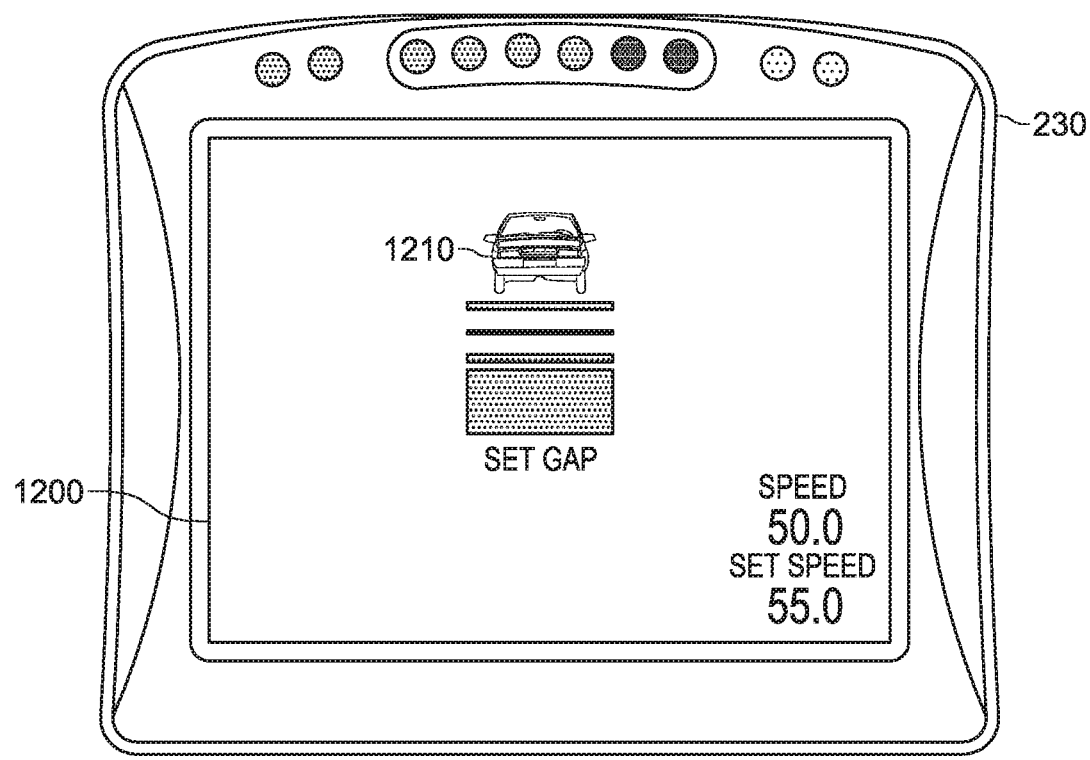

FIGS. 11-15 shows the display device 230 displaying several graphical user interfaces illustrating vehicles available for controlling and/or locking while a user rides a motorcycle, in accordance with some embodiments. FIG. 11 illustrates a graphical user interface 1100 displayed on the display device 230 of a motorcycle 10. The graphical user interface 1100 shows that the motorcycle 10 does not have another vehicle to control to. FIG. 12 illustrates a graphical user interface 1200 displayed on the display device 230 when the motorcycle 10 detects another vehicle (shown by an object 1210) that is available for the motorcycle 10 to control to.

Figure 13:
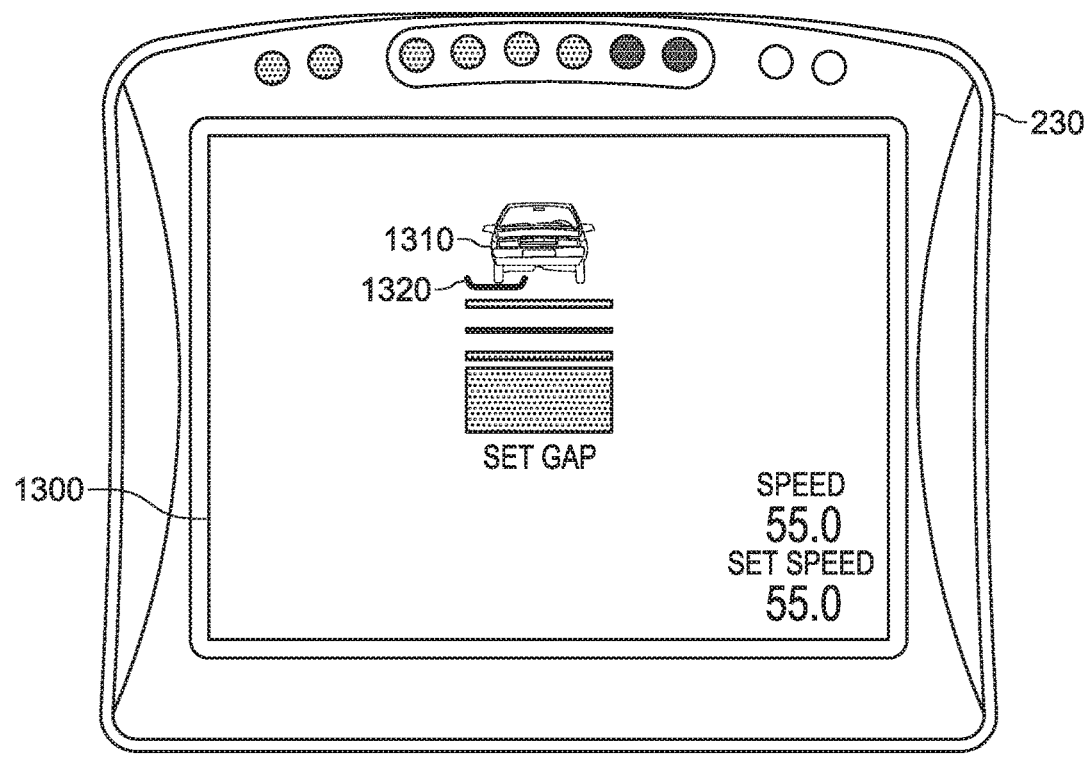
Figure 14:
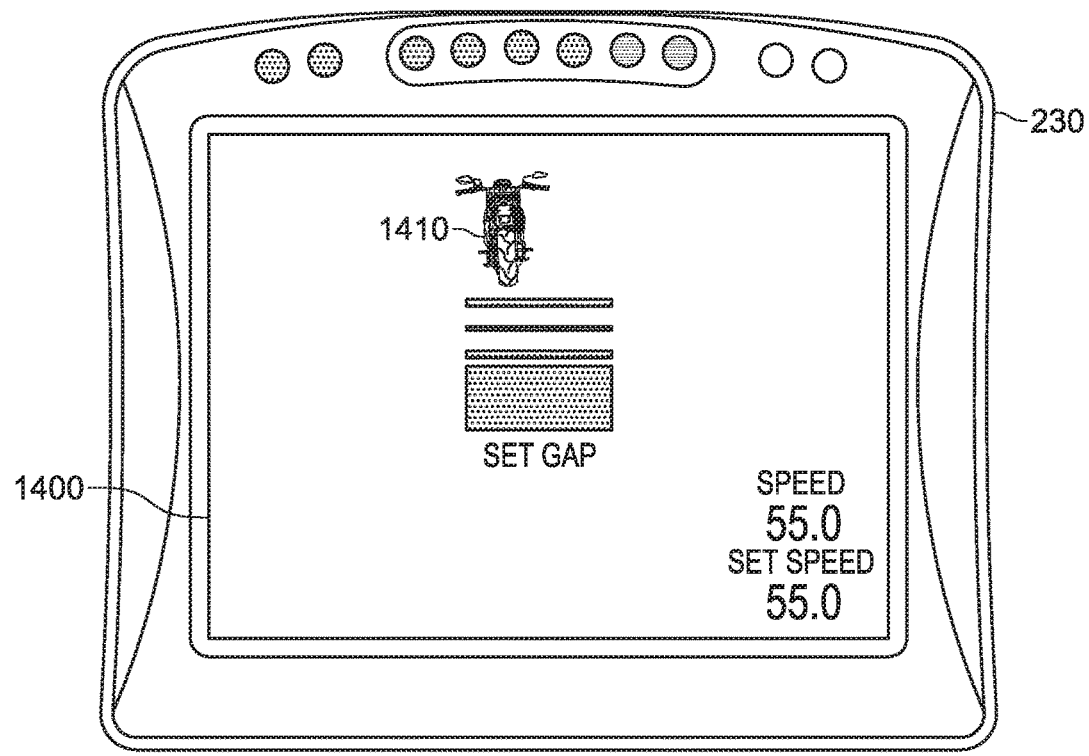
Figure 15:
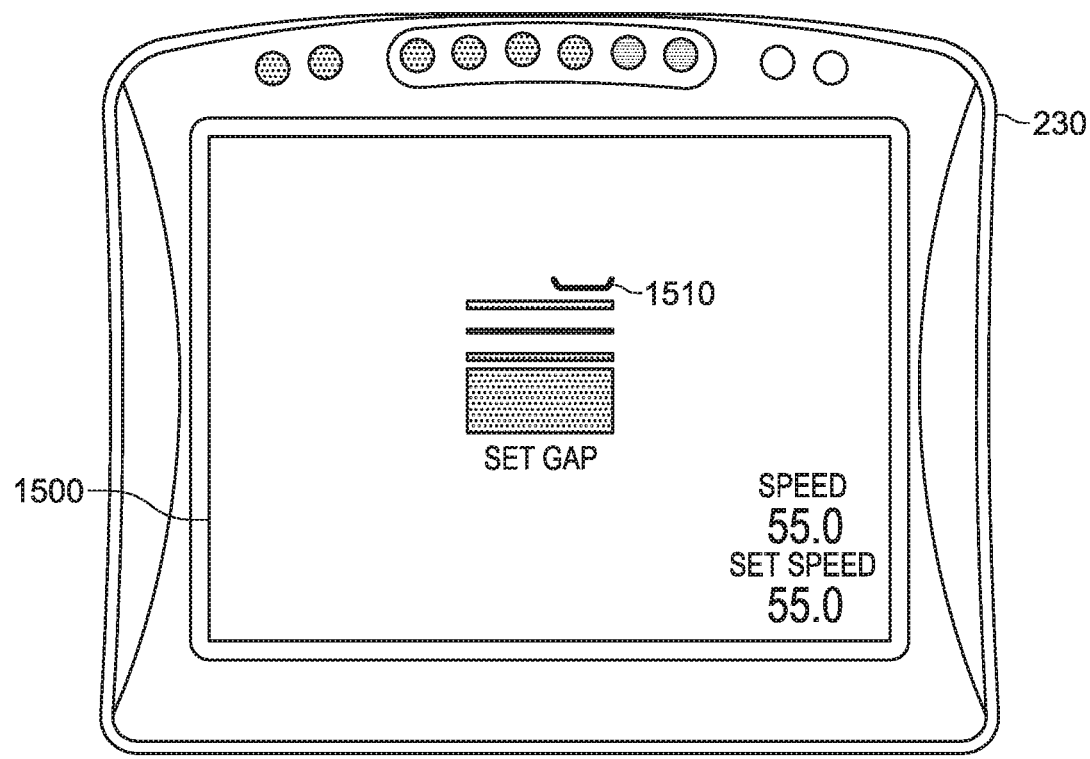

FIG. 13 illustrates a graphical user interface 1300 displayed on the display device 230 of the motorcycle 10. The graphical user interface 1300 includes an object 1310 representing another vehicle that is used by the motorcycle 10 to control to. The graphical user interface 1300 also shows an object 1320 representing another vehicle other than the vehicle represented by object 1310. As shown in the graphical user interface 1300, the vehicle represented by object 1320 is located to the left of the path of travel of the vehicle represented by object 1310. In addition, the graphical user interface 1300 also indicates that the vehicle being represented by object 1320 is not being controlled to. FIG. 14 illustrates a graphical user interface 1400 displayed on the display device 230 of the motorcycle 10. The graphical user interface 1400 includes an object 1410 that indicates that the motorcycle 10 is locked to the vehicle located to the left of the path of travel of motorcycle 10. FIG. 15 illustrates a graphical user interface 1500 displayed on the display device 230 of the motorcycle 10. The graphical user interface 1500 includes an object 1510 that indicates that a vehicle is present to the right of the motorcycle 10 that may be locked onto if desired by the rider.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Various features and advantages of some embodiments are set forth in the following claims.

I claim:

1. A system for providing adaptive cruise control in a motorcycle, the system comprising:
an electronic controller coupled to a transceiver, the electronic controller including an electronic processor configured to
select, as a target vehicle for the adaptive cruise control, a first vehicle detected on one side of a direct path of travel of the motorcycle based on data received from a transceiver, the first vehicle within a field of view of the transceiver;
and
control, via the adaptive cruise control, the speed of the motorcycle dynamically based on an output of a first kinematic controller, wherein the first kinematic controller is configured to receive a first input including at least one of an item selected from the group consisting of distance of the motorcycle to the target vehicle, velocity of the target vehicle, velocity of the motorcycle, a cruise set speed associated with the motorcycle, a desired separation distance between the motorcycle and the target vehicle, and a desired separation time between the motorcycle and the target vehicle.

2. The system of claim 1, wherein the electronic processor is further configured to
determine the presence of a second vehicle, wherein the second vehicle is in the direct path of travel of the motorcycle; and
control the speed of the motorcycle dynamically based on an output of a second kinematic controller, wherein the second kinematic controller is configured to receive a second input including at least one of an item selected from the group consisting of distance of the motorcycle to the second vehicle, velocity of the second vehicle, velocity of the motorcycle, a cruise set speed associated with the motorcycle, a desired separation distance between the motorcycle and the second vehicle, and a desired separation time between the motorcycle and the second vehicle.

3. The system of claim 2, wherein the electronic processor is further configured to
determine the presence of a third vehicle, wherein the third vehicle is in front of the second vehicle; and
control the speed of the motorcycle dynamically based on an output of a third kinematic controller, wherein the third kinematic controller is configured to receive a third input including at least one of an item selected from the group consisting of distance of the motorcycle to the third vehicle, velocity of the third vehicle, velocity of the motorcycle, a cruise set speed associated with the motorcycle, a desired separation distance between the motorcycle and the third vehicle, and a desired separation time between the motorcycle and the third vehicle.

4. The system of claim 3, wherein the electronic processor is further configured to
control the speed of the motorcycle based on a minimum of the output of the first kinematic controller, the second kinematic controller, and the third kinematic controller.

5. The system of claim 1, wherein the electronic controller is further configured to
generate a graphical user interface including a first object representing the first vehicle.

6. The system of claim 5, wherein the electronic processor is further configured to
receive an input associated with a user selection of the first object as the target vehicle for controlling the speed of the motorcycle.

7. The system of claim 6, further comprising:
an input device on a hand control of the motorcycle to receive the input.

8. The system of claim 7, wherein the input device is configured to set at least one of a gap distance and a gap time between the motorcycle and the first vehicle.

9. The system of claim 7, further comprising:
wherein the input device when engaged is configured to select the first vehicle as the target vehicle for the adaptive cruise control.

10. The system of claim 1, further comprising a camera coupled to the electronic controller, the camera configured to determine the presence of the first vehicle.

11. The system of claim 1, wherein the transceiver includes one selected from the group consisting of a radar sensor, a LIDAR sensor, and an ultrasonic sensor.

12. The system of claim 1, further comprising:
a braking system coupled to the electronic controller, the braking system configured to control the speed of the motorcycle based on an item selected from the group consisting of distance of the motorcycle to the first vehicle, velocity of the first vehicle, velocity of the motorcycle, a cruise set speed associated with the motorcycle, a desired separation distance between the motorcycle and the first vehicle, and a desired separation time between the motorcycle and the first vehicle.

13. The system of claim 1, further comprising:
an acceleration control system coupled to the electronic controller, the acceleration control system configured to control the speed of the motorcycle based on an item selected from the group consisting of distance of the motorcycle to the first vehicle, velocity of the first vehicle, velocity of the motorcycle, a cruise set speed associated with the motorcycle, a desired separation distance between the motorcycle and the first vehicle, and a desired separation time between the motorcycle and the first vehicle.

14. A method of providing adaptive cruise control for a motorcycle, the method comprising:
selecting, with an electronic processor as a target vehicle for the adaptive cruise control, a first vehicle detected on one side of a path of travel of the motorcycle, the first vehicle within a field of view of the transceiver; and
dynamically controlling via the adaptive cruise control, with the electronic processor, the speed of the motorcycle based on an item selected from the group consisting of distance of the motorcycle to the target vehicle, velocity of the target vehicle, velocity of the motorcycle, a cruise set speed associated with the motorcycle, a desired separation distance between the motorcycle and the target vehicle, and a desired separation time between the motorcycle and the target vehicle.

15. The method of claim 14, further comprising:
determining, with the electronic processor, the presence of a second vehicle, wherein the second vehicle is in the direct path of travel of the motorcycle; and dynamically controlling the speed of the motorcycle based on an item selected from the group consisting of distance of the motorcycle to the second vehicle, velocity of the second vehicle, velocity of the motorcycle, the cruise set speed associated with the motorcycle, a desired separation distance between the motorcycle and the second vehicle, and a desired separation time between the motorcycle and the second vehicle.

16. The method of claim 15, further comprising:
determining, with the electronic processor, the presence of a third vehicle, wherein the third vehicle is in front of the second vehicle; and
dynamically controlling the speed of the motorcycle based on an item selected from the group consisting of distance of the motorcycle to the third vehicle, velocity of the third vehicle, velocity of the motorcycle, the cruise set speed associated with the motorcycle, a desired separation distance between the motorcycle and the third vehicle, and a desired separation time between the motorcycle and the third vehicle.

17. The method of claim 16, further comprising:
generating, with the electronic processor, a graphical user interface including a first object representing the first vehicle, a second object representing the second vehicle, and a third object representing the third vehicle; and
displaying the graphical user interface on a display device.

18. The method of claim 14, further comprising:
receiving, with the electronic processor, an input associated with a user selection of the first object as the target vehicle for controlling the speed of the motorcycle.

19. The method of claim 18, wherein selecting the first vehicle as the target vehicle includes selecting the first vehicle as the target vehicle in response to receiving an input from an input device on a hand control of the motorcycle.

20. The method of claim 14, further comprising:
setting at least one of a gap time and a gap distance using an input device on a hand control of the motorcycle.

21. A non-transitory, machine-readable medium containing computer-executable instructions that when executed by one or more electronic processors cause the one or more electronic processors to perform a set of functions, the set of functions comprising:
selecting, as a target vehicle for the adaptive cruise control, a first vehicle detected on one side of a path of travel of the motorcycle; and
dynamically controlling, via the adaptive cruise control, the speed of the motorcycle based on an item selected from the group consisting of distance of the motorcycle to the target vehicle, velocity of the target vehicle, velocity of the motorcycle, a cruise set speed associated with the motorcycle, a desired separation distance between the motorcycle and the target vehicle, and a desired separation time between the motorcycle and the target vehicle.

22. The non-transitory machine-readable medium of claim 21, wherein the set of functions further comprising:
determining the presence of a second vehicle, wherein the second vehicle is in the direct path of travel of the motorcycle; and
dynamically controlling the speed of the motorcycle based on an item selected from the group consisting of distance of the motorcycle to the second vehicle, velocity of the second vehicle, velocity of the motorcycle, the cruise set speed associated with the motorcycle, a desired separation distance between the motorcycle and the second vehicle, and a desired separation time between the motorcycle and the second vehicle.

23. The non-transitory machine-readable medium of claim 22, wherein the set of functions further comprising:
determining the presence of a third vehicle, wherein the third vehicle is in front of the second vehicle; and
dynamically controlling the speed of the motorcycle based on an item selected from the group consisting of distance of the motorcycle to the third vehicle, velocity of the third vehicle, velocity of the motorcycle, the cruise set speed associated with the motorcycle, a desired separation distance between the motorcycle and the third vehicle, and a desired separation time between the motorcycle and the third vehicle.

24. The non-transitory machine-readable medium of claim 23, wherein the set of functions further comprising:
generating a graphical user interface including a first object representing the first vehicle, a second object representing the second vehicle, and a third object representing the third vehicle; and
displaying the graphical user interface on a display device.

25. The non-transitory machine-readable medium of claim 24, wherein the set of functions further comprising:
receiving an input associated with a user selection of the first object as the target vehicle for controlling the speed of the motorcycle.

26. The non-transitory machine-readable medium of claim 25, wherein the set of functions further comprising:
selecting the target vehicle for the adaptive cruise control using an input device on a hand control of the motorcycle.

* * * * *